3,708,398
FERMENTATION PROCESS FOR THE PRODUCTION OF CITRIC ACID
Joseph L. Sardinas, Gales Ferry, Conn., assignor to Pfizer Inc., New York, N.Y.
No Drawing. Filed Nov. 9, 1970, Ser. No. 88,115
Int. Cl. C12d 1/04
U.S. Cl. 195—37                               9 Claims

ABSTRACT OF THE DISCLOSURE

A process for producing citric acid by aerobically fermenting an aqueous carbohydrate-containing nutrient medium with selected yeast strains.

BACKGROUND OF THE INVENTION

This invention relates to a process for the production of citric acid by fermentation. In particular it relates to a process for the production of citric acid which comprises selecting a suitable citric acid-accumulating yeast strain, propagating the strain in an aqueous carbohydrate-containing nutrient medium, and recovering therefrom the accumulated citric acid.

Because of its ease of assimilation, palatability and low toxicity, citric acid is one of the most widely used acids in the food and pharmaceutical industry. The acid is widely used as an acidulant in beverages and also as an anti-oxidant for inhibiting rancidity in fats and oils. Both the acid and its salts are employed as buffers in the preparation of jams, jellies, and gelatin preparations, and as emulsifiers and stabilizers in various food products.

Most of the world's supply of citric acid is produced by carbohydrate fermentation processes. The microorganisms most commonly used in these processes are selected strains of *Aspergillus niger*. While these fermentation processes with *Aspergillus niger* are attractive, many difficulties are experienced. For example, over a period of time the citric acid-producing nature of the *Aspergillus niger* culture tends to degenerate. Of more importance is the fact that a relatively long period of time, generally more than 7 days, is required for the production of large quantities of citric acid by fermentation with *Aspergillus niger*. This long fermentation time is one of the major factors responsible for the high cost of producing citric acid. Thus it is obvious that the development of a rapid fermentation process for the production of citric acid is of considerable commercial importance.

Belgian Pat. 724,553 teaches a process for the production of citric acid by *Candida oleophila* in an aqueous carbohydrate nutrient medium. The production of citric acid in carbohydrate containing media by *Trichoderma viride* is described in Belgian Pat. 570,341. In a specification published Sept. 5, 1968 under Japanese patent specification number 20,707/68, a process is described for the production of citric acid comprising aerobic culture of strains of Candida, Debaromyes, Hansenula, Torulopsis, Pichia, Saccharomyces, Kloeckera or Trichosporon in a carbohydrate culture medium.

There are other reports in the literature describing the propagation of various strains of yeast in aqueous carbohydrate nutrient media such as that of Kudryavtsen et al., Microbiologiya 31, No. 4 582–585 (1962). However, it does not necessarily follow that all strains of yeast accumulate significant amounts of citric acid. Differentiation must be made between trace amounts of citric acid (due to some autolysis and leaky cells) and accumulation (at least one gram/liter) of citric acid. Unless there is a block in the Kreb's cycle, the addition of more sugar to the medium does not automatically lead to the production of citric acid or accumulation of higher levels of the acid. It is well known that many strains of yeast produce organic acids. It must be carefully established by appropriate analytical means that citric acid is the main organic acid produced, and that it in turn is distinguished from isocitric acid.

It has been reported by M. Ogur et al., in Biochemical and Biophysical Research, 14, 193 (1964), that certain strains of Saccharomyces are capable of accumulating citric acid but the levels reported (mere milligrams per liter) are insignificant and of no commercial interest.

Because of the commercial importance of citric acid, there is a continual need for cost-saving processes which result from a shortening of the fermentation cycle by rapidly growing microorganisms which accumulate citric acid in good yield, co-produce a low concentration of impurities and are readily removed by filtration or centrifugation.

SUMMARY OF THE INVENTION

This invention is concerned with a process for the production of citric acid by aerobically fermenting an aqueous carbohydrate medium with a yeast. In particular, this invention describes a fermentation process for producing citric acid which comprises fermenting an aqueous carbohydrate-containing medium with a citric acid-accumulating yeast strain selected from such genera as Rhodotorula, Nematospora, Sporobolomyces, Zygosaccharomyces and Torula.

DETAILED DESCRIPTION OF THE INVENTION

In classifying the yeasts of the present invention, the classification systems described in "The Chemistry and Biology of Yeasts," edited by A. H. Cook, Academic Press, Inc., New York, 1958 and "The Yeasts-A Taxonomic Study," J. Lodder and N. J. W. Kreger-van Rij, North Holland Publ., Amsterdam, 1952 have been followed.

We have now surprisingly found that certain strains of yeasts, in particular osmophilic yeast strains, have the ability to accumulate citric acid during the fermentation of aqueous, carbohydrate-containing media.

In particular, we have found that many yeasts will produce substantial amounts of citric acid, viz, more than one gram per liter of medium, during the aerobic fermentation of aqueous carbohydrate-containing media.

Among others, individual yeast strains belong to the following genera have been shown to accumulate such amounts of citric acid during the aerobic fermentation of aqueous carbohydrate-containing media: Rhodotorula, Nematospora, Sporobolomyces, Zygosaccharomyces and Torula.

The process of the present invention is conveniently carried out by first preparing an inoculum of the appropriate yeast. A portion of the inoculum is then added to the aqueous fermentation medium, which contains conventional nutrients, e.g. an assimilable source of nitrogen, carbohydrate and preferably calcium carbonate. The fermentation is then shaken aerobically at a temperature of 20 to 37° C., with a temperature of 25° C. being preferred, until citric acid accumulates in the medium. Excellent results are obtained in about 72 to 120 hours.

It is preferred to maintain the pH of the medium from about 1.5 to 8.0 during the fermentation with a pH range of about 2 to 7 being preferred, during the course of the fermentation.

As the citric acid forms during the fermentation, it reacts with the calcium carbonate yielding insoluble calcium citrate, which separates from the fermentation medium, and carbon dioxide, some of which is assimilated by the propagating yeast cells.

In those cases where substantial amounts of citric acid are produced, the acid is generally isolated as the insoluble calcium citrate by methods well known to those in the art. The outstanding advantage of the instant fermentation process over those previously used for the production of citric acid is its simplicity and rapidity.

The yeast inoculum may be prepared by propagating the yeast cells from a slant for about 24 hours under aerobic conditions in an aqueous fermentation medium containing an assimilable carbohydrate, generally glucose; an assimilable nitrogen source, preferably peptone; yeast extract; and sodium chloride. The broth is usually agitated at room temperature during the fermentation, and the final pH of the medium at the end of the 24 hour period is usually about 4.5. The rate of growth of the yeast cells is periodically determined by centrifuging the broth for 15 minutes at about 2000 g. Generally, a yeast cell density (spindown) of 0.5 ml. of yeast cells per 15 ml. of broth is preferred before the broth is used for inoculation.

After agitating the above inoculation culture at room temperature for about 24 hours, a portion of it is added to the aqueous fermentation medium, which contains a carbohydrate and source of assimilable nitrogen. We prefer such carbohydrates as potato or corn starch, molasses, sucrose, glucose, maltose, dextrin, fructose, and galactose. Because of its avilability and low cost we generally prefer to use a molasses as the carbohydrate source, and we use amounts equivalent to as much as 28% by weight of sugar.

A further highly significant advantage of the process of the present invention lies in the fact that pretreatment of the molasses for metal ion control is unnecessary. As is well known, prior art citrate fermentations which utilize molasses or ordinarily sensitive to the metal ion contaminants and require that the molasses be pretreated and appropriately purified before use. See for example, D. S. Clark, Industrial and Engineering Chemistry Product Research and Development, 1, 59 (1962).

As an available nitrogen source, such nitrogen-containing organic materials as wheat bran, soybean meal, urea, amino acids, peptones, and enzymatically digested proteins, can be used. We have found the commercially available product YTT, a casein peptone source available from the Sheffield Chemical Co., Norwich, N.Y., to be a convenient source of assimilable nitrogen. We generally use from 1 to 20 g. of this peptone source per liter of medium. Inorganic compounds may also serve as sources of assimilable nitrogen. Of these we prefer ammonium nitrate, ammonium sulfate and ammonium chloride.

The following mineral cations and anions are also considered beneficial for the growth of the yeasts: sodium, potassium, cobalt, phosphate, and sulfate. It is well known that trace amounts of various vitamins such as biotin also play a role in cell growth. Most of these trace vitamins and essential minerals are present as impurities in the crude nitrogen and carbon sources, and consequently it is not usually necessary to add them individually to the fermentation medium. Calcium carbonate also promotes the growth of the yeast cells and is generally added to the medium.

The fermentation is allowed to proceed aerobically, usually for about 72 to 120 hours with agitation, at a temperature from about 20 to 37° C., although a temperature of about 25° C. is preferred. While any form of aerobic incubation is satisfactory, controlled aeration, as for example agitation under air, or passing air through the fermentation medium, is generally employed. Although we prefer to carry out the fermentation aerobically, it is also possible to perform it under anaerobic conditions using an oxidizer other than oxygen as the terminal hydrogen acceptor.

During the course of the fermentation the pH of the medium is maintained anywhere from about 1.5 to 8.0, although a pH range of about 2.0 to 7.0 is preferred. We have found that during the initial stages of the fermentation the pH should preferably not be too low, e.g., not less than about 3.0, otherwise there will be insufficient yeast growth. When, however, sufficient yeast growth has been established, the pH is then maintained within the limits given above.

When substantial amounts of citric acid are produced, the acid may be isolated from the fermentation medium by various methods well known to those skilled in the art. As mentioned above, we generally prefer to incorporate calcium carbonate in the fermentation medium, usually an amount of from 5 to 25 g. per liter of fermentation medium. As the citric acid forms, it reacts metatheticaly with the calcium carbonate, yielding carbon dioxide and insoluble calcium citrate, which can then be conveniently removed from the fermentation medium. It appears that some of the liberated carbon dioxide is metabolized by the yeast cells and thus promotes their growth in the medium. Instead of $CaCO_3$, one can also use $BaCO_3$, $BaO$, $CaO$, $NaOH$, and $KOH$.

It should be understood that when reference is made herein and in the claims to recovering citric acid from the medium, this expression is intended to embrace recovery in the form of a salt, such as the calcium salt, as well as recovery as critic acid per se. The salts can be conveniently converted to the free acid by methods well known to those skilled in the art.

In the present invention, a citric acid-accumulating yeast is defined as one which will accumulate at least one gram of critic acid per liter of medium under the fermentation conditions described. The use of a yeast strain that accumulates less than one gram of critic acid per liter of medium is of little or no practical value.

Analytical techniques and methods of analysis for the determination of citric acid are described as follows:

METHODS OF ANALYSIS

(I) Paper chromatography

The systems below provide a convenient semi-quantitative means for determining citric acid in the fermentation medium. Concentrations of citric acid even lower than 1 gram per liter of medium, i.e., 1 mg. per ml. of medium, can be readily detected by these chromatographic methods.

(1) Solvent system A

This solvent system is a mixture by volume of 80 parts methyl ethyl ketone, 6 parts acetone, 12 parts distilled water and 2 parts formic acid. Citric acid exhibits an $Rf$ of about 0.59 to 0.64 with this system.

(2) Solvent system B

This solvent system consists of by volume 1 part formic acid, 2 parts cineole, and 3 parts n-propanol. The $Rf$ of citric acid with this system is aobut 0.40 to 0.45.

(3) Solvent system C

This solvent system consists of a water-saturated formic acid-ether mixture prepared by shaking together in a separatory funnel a mixture consisting of 2100 ml. of ethyl ether, 300 ml. of formic acid, and 275 ml. of water. After shaking, the upper solvent layer is used as the chromatographic solvent. The $Rf$ of citric acid with this system is about 0.30 to 0.35.

A 5 to 10 microliter sample of the fermentation medium, which has been treated as described above is placed on the paper, and the chromatogram run in the usual manner. We generally use Whatman No. 1 paper as the adsorbent and Bromocresol Green as the indicator (prepared by dissolving 0.25 g. of Bromocresol Green in 400 ml. of acetone and adjusting the solution to green color) in these analyses. In all cases an authentic sample of citric acid is run with each chromatogram as a standard.

(II) Acetic anhydride-pyridine analysis

This method is described by J. R. Marier and M. Boulet in J. Dairy Sci., 41, 1683 (1958). Because of its simplicity, we generally prefer to use this method to determine quantitatively the amount of citric acid in the medium.

After treating the 25 ml. fermentation medium used in the screening as described above, the filtrate or supernatant is diluted with 0.1 N HCl to 100 ml. Aliquots of this stock solution are than analyzed for citric acid in the manner described in the above article.

(III) Gas chromatography

Another quantitative method for determining citric acid that we have used is a modification of a method described by N. W. Alcock, Anal. Biochem., 33, 2 (1965). This analysis is carried out with an F and M model 500 gas chromatograph fitted with F and M model 1609 flame ionization detector under the following conditions:

Column—Aluminum, 6' x ¼" packed with 5% DEGA on ABS
Column T—170° C.
Injection port T—260° C.
Detection block T—260° C.
Helium flowrate—10.5 reading on Brooks R-2-15AAA flowmeter
Hydrogen flowrate—8.0 reading on Brooks R-2-15AAA flowmeter
Air flowrate—12.0 reading on Brooks R-2-15AAA flowmeter
Sample size—5 microliters A standard curve is prepared by first weighing out exactly the following amounts of citric acid: 50, 100, 150, 200 and 300 mg. To each of these samples is added 10 ml. of boron trifluoride dissolved in a small amount of ethanol. The mixture is heated at 90° for 10 minutes and cooled. Each sample is added to a separatory funnel containing a mixture of 10 ml. of distilled water and 4 ml. of chloroform and vigorously shaken for 30–40 seconds. The lower chloroform layer is separated and added to a Teflon-lined, screw-capped 10 ml. test tube. The aqueous phase in the separatory funnel is extracted with two 3-ml. portions of chloroform which are also added to the test tube. A 5 microliter portion of each sample is injected into the chromatograph and a standard curve is prepared by plotting the amount of citric acid as abscissa and the corresponding peak areas of the chromatogram as ordinate. The determination of the peak areas are conveniently calculated by means of an integrator attached to the Gas Chromatograph.

A sample eof the fermentation medium is then taken, the pH adjusted to about 2.0 with concentrated hydrochloric acid, and the mixture either centrifuged or filtered to remove suspended matter. To 5 ml. of the clear solution is added 20 ml. of 2,2-dimethoxypropane. The resultant solution is then evaporated to dryness on an open water bath, set at 60–80° C. To the dry residue is added 10 ml. of boron trifluoride in methanol. This solution is treated exactly in the same manner as the standard above. The amount of citric acid in the sample is readily calculated by comparison with the standard curve.

It is to be further understood that the process of the present invention also embraces the use of yeast mutants or varians produced by various chemical and physical means, provided, of course, that they exhibit the specified citric acid-accumulating ability. Such mutants are produced by techniques such as X-ray and UV radiation; treatment with nitrogen mustards and organic peroxides; and other similar techniques well known to those skilled in the art.

In addition, the use of subcultures, natural mutants, variants and the like, is contemplated in carrying out the process of the present invention.

The following examples are provided to more fully illustrate the present invention, but are not to be construed as limiting the scope thereof.

Preparation of inoculum

A slant containing yeast cells is transferred to 50 ml. of liquid Sabouraud's medium contained in a 300 ml. Erlenmeyer flask. The flask is incubated on a rotary shaker for 2–3 days at 28° C.

EXAMPLE I

Fifty ml. of inoculum of the citric acid-accumulating yeast strain, *Rhodotorula rubra* CMI 38784 prepared as described above, is added to an aqueous, sterilized nutrient medium containing the following ingredients:

| | Grams/liter |
|---|---|
| Crude sugar from cane molasses | 135.0 |
| Cotton seed meal | 3.0 |
| Calcium carbonate | 13.0 |
| Urea | 8.0 |
| Urethane polyether resin (Voranol, Dow Chemical) ml | 0.2 |
| Lead acetate | 0.1 |

No pH adjustment.
Autoclaved 30 minutes at 121° C.

| | |
|---|---|
| Fluoracetamide [1] | 0.1 |
| Lead acetate [2] | 0.5 |

[1] Added after autoclaving.
[2] Added at 9 hours.

The inoculated medium (2 liters contained in a 4 liter stirred fermenter) is incubated at 28° C. with aeration at a rate of 0.75 volumes of air per volume of medium per minute and stirring at 1750 r.p.m. After 5 days the fermentation yield of citric acid is 18.4 grams/liter, and the citric acid is recovered.

EXAMPLE II

The process of Example I is repeated in turn with each of the following yeast strains: Sporobolomyces sp. ATCC No. 20291, *Nematospora coryli* ATCC No. 20292, *Rhodotorula glutinis* ATCC No. 2527, Sporobolomyces sp. ATCC 20290, *Zygosaccharomyces mellis* NRRL Y–1053, *Sporobolomyces salmonicolor* CBS 490, *Torula racemosa* ATCC No. 20288 and *Torula racemosa* ATCC No. 20289. The fermentation medium of Example I is modified as follows:

| | Grams/liter |
|---|---|
| Crude sugar from cane molasses | 270.0 |
| Cotton seed meal | 3.0 |
| Calcium carbonate | 13.0 |
| Urea | 10.0 |

No pH adjustment.
Autoclaved 30 minutes at 121° C.

| | |
|---|---|
| Fluoracetamide [1] | 0.1 |
| Lead acetate [2] | 0.2 |

[1] Added after autoclaving.
[2] Added at 9 hours.

Results obtained with each of the indicated yeast strains are shown in the following table:

| Yeast strain | Public culture depository No. | Fermentation time (days) | Citric acid (gms./liter) |
|---|---|---|---|
| Sporobolomyces sp | ATCC No. 20291. | 5 | 71.3 |
| Nematospora coryli | ATCC No. 20292. | 5 | 73.8 |
| Rhodotorula glutinis | ATCC No. 2527. | 5 | 91.0 |
| Sporobolomyces sp | ATCC No. 20290. | 5 | 89.3 |
| Zygosaccharomyces mellis | NRRL Y–1053. | 5 | 18.3 |
| Sporobolomyces salmonicolor | CBS 490 | 3 | 43.0 |
| Torula ramosa | ATCC No. 20288 | 3 | 30.0 |
| Do | ATCC No. 20289 | 3 | 33.0 |

What is claimed is:

1. A process for producing citric acid which comprises propagating *Nematospora coryli* ATCC No. 20292 under aerobic conditions in an aqueous carbohydrate-containing medium until a level of at least about 1 gram of citric acid accumulates per liter of said medium, and recovering said citric acid.

2. A process for producing citric acid which comprises propagating Sporobolomyces sp. ATCC No. 20291 under aerobic conditions in an aqueous carbohydrate-containing medium until a level of at least about 1 gram of citric acid accumulates per liter of said medium, and recovering said citric acid.

3. A process for producing citric acid which comprises propagating Sporobolomyces sp. ATCC No. 20290 under aerobic conditions in an aqueous carbohydrate-containing medium until a level of at least about 1 gram of citric acid accumulates per liter of said medium, and recovering said citric acid.

4. A process for producing citric acid which comprises propagating *Sporobolomyces salmonicolor* CBS 490 under aerobic conditions in an aqueous carbohydrate-containing medium until a level of at least about 1 gram of citric acid accumulates per liter of said medium, and recovering said citric acid.

5. A process for producing citric acid which comprises propagating *Rhodotorula glutinis* ATCC No. 2527 under aerobic conditions in an aqueous carbohydrate-containing medium until a level of at least about 1 gram of citric acid accumulates per liter of said medium, and recovering said citric acid.

6. A process for producing citric acid which comprises propagating *Rhodotorula rubra* CMI 38784 under aerobic conditions in an aqueous carbohydrate-containing medium until a level of at least about 1 gram of citric acid accumulates per liter of said medium, and recovering said citric acid.

7. A process for producing citric acid which comprises propagating *Torula ramosa* ATTC No. 20288 under aerobic conditions in an aqueous carbohydrate-containing medium until a level of at least about 1 gram of citric acid accumulates per liter of said medium, and recovering said citric acid.

8. A process for producing citric acid which comprises propagating *Torula ramosa* ATCC No. 20289 under aerobic conditions in an aqueous carbohydrate-containing medium until a level of at least about 1 gram of citric acid accumulates per liter of said medium, and recovering said citric acid.

9. A process for producing citric acid which comprises propagating *Zygosaccharomyces mellis* NRRL Y-1053 under aerobic conditions in an aqueous carbohydrate-containing medium until a level of at least about 1 gram of citric acid accumulates per liter of said medium, and recovering said citric acid.

References Cited

FOREIGN PATENTS 6,820,707    9/1968    Japan.

A. LOUIS MONACELL, Primary Examiner

G. M. NATH, Assistant Examiner